(12) United States Patent
Dalfra et al.

(10) Patent No.: US 12,066,831 B2
(45) Date of Patent: Aug. 20, 2024

(54) SELF-MOVING DEVICE, OBSTACLE DETECTION METHOD THEREOF, AND OBSTACLE DETECTION MODULE

(71) Applicant: Positec Power Tools (Suzhou) Co., Ltd, Suzhou (CN)

(72) Inventors: Davide Dalfra, Vicenza (IT); Emanuel Conti, Vicenza (IT); Federico Testolin, Vicenza (IT)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 404 days.

(21) Appl. No.: 17/427,893

(22) PCT Filed: Jan. 31, 2020

(86) PCT No.: PCT/CN2020/074125
§ 371 (c)(1),
(2) Date: Aug. 2, 2021

(87) PCT Pub. No.: WO2020/156518
PCT Pub. Date: Aug. 6, 2020

(65) Prior Publication Data
US 2022/0121217 A1    Apr. 21, 2022

(30) Foreign Application Priority Data
Feb. 3, 2019  (CN) .......................... 201910108695.8

(51) Int. Cl.
*G05D 1/00* (2024.01)
(52) U.S. Cl.
CPC .................................. *G05D 1/0255* (2013.01)
(58) Field of Classification Search
CPC .. A01D 2101/00; A01D 34/00; A01D 34/008; A01D 75/185; G01S 7/4865;
(Continued)

(56) References Cited

U.S. PATENT DOCUMENTS 9,076,337 B2 *  7/2015  Wang ..................... B25J 9/1676
10,203,399 B2 *  2/2019  Retterath .............. G01S 7/4863
(Continued)

FOREIGN PATENT DOCUMENTS

CN     103941735 A    7/2014
CN     105223951 A    1/2016
(Continued)

OTHER PUBLICATIONS

Shraga Shoval et al., "Using Coded Signals To Benefit From Ultrasonic Sensor Crosstalk In Mobile Robot Obstacle Avoidance", Proceedings of the 2001 IEEE International Conference on Robotics & Automation, ICRA 2001. Seoul, Korea, May 12-26, 2001, [Proceedings of the IEEE International Conference on Robotics and Automation] , New York, NY: IEEE, US, vol. 3, May 21, 2001, pp. 2879-2884, XP010550579, DOI: 10.1109/ROBOT.2001.933058, ISBN: 978-0-7803-6576-6.

(Continued)

*Primary Examiner* — Redhwan K Mawari
(74) *Attorney, Agent, or Firm* — Lee & Hayes, P.C.

(57) ABSTRACT

The present invention relates to a self-moving device, where the self-moving device includes at least two non-contact obstacle detection modules, respectively located on two side of a housing in a moving direction and configured to transmit detection signals and receive reflected detection signals, to detect an obstacle in the moving direction of the self-moving device; the self-moving device further includes a control module, and the control module turns on each obstacle detection module in a time-sharing manner to transmit the detection signal and turns on each obstacle detection module in the time-sharing manner to receive the reflected detection signal, to obtain detection data; and the control module determines a location of the obstacle according to the obtained detection data, a corresponding identity (Continued)

of the obstacle detection module that transmits the detection signal, and a corresponding identity of the obstacle detection module that receives the detection signal, to control the self-moving device to move and/or turn to avoid the obstacle, and the identities of the obstacle detection modules are related to positions of the obstacle detection modules relative to the housing.

18 Claims, 9 Drawing Sheets

(58) Field of Classification Search
CPC .............. G01S 7/4815; G01S 17/93; G05D 2201/0208; G05D 1/0238; G05D 1/0255; G05D 1/0248; G05D 1/0242
See application file for complete search history.

(56) References Cited

U.S. PATENT DOCUMENTS

| | | | | |
|---|---|---|---|---|
| 10,750,918 | B2* | 8/2020 | Jung | G05D 1/0238 |
| 11,256,267 | B2* | 2/2022 | Sheng | G05D 1/0255 |
| 2005/0166357 | A1* | 8/2005 | Uehigashi | G05D 1/0274 |
| | | | | 15/319 |
| 2007/0145933 | A1* | 6/2007 | Kosaka | G05D 1/027 |
| | | | | 318/587 |
| 2015/0131080 | A1* | 5/2015 | Retterath | G01S 17/10 |
| | | | | 356/5.01 |
| 2017/0074984 | A1* | 3/2017 | Maisonnier | G05D 1/0248 |
| 2019/0265724 | A1* | 8/2019 | Sheng | G05D 1/0255 |

FOREIGN PATENT DOCUMENTS

| | | | |
|---|---|---|---|
| CN | 208027167 U | 10/2018 | |
| CN | 108733041 A | 11/2018 | |
| EP | 3 508 048 A1 | 10/2019 | |
| JP | 3207621 B2 * | 9/2001 | |
| JP | 2004258266 A * | 9/2004 | |
| JP | 3595625 B2 * | 12/2004 | |
| WO | WO-2017133638 A1 * | 8/2017 | ............ A01D 34/00 |
| WO | WO-2017198226 A1 * | 11/2017 | ............ A01D 34/00 |
| WO | 2018041146 A1 | 3/2018 | |

OTHER PUBLICATIONS

Fernando Moita et al., "Multi-Echo Technique for Feature Detection and Identification using Simple Sonar Configurations", Advanced Intelligent Mechatronics, 2001. Proceedings. 2001 IEEE/ASME International Conference on Jul. 8-12, 2001, Piscataway, NJ, USA, IEEE, vol. 1, Jul. 8, 2001, pp. 389-394, XP010553283, ISBN: 978-0-7803-6736-4.

English translation of Chinese First Office Action dated Mar. 18, 2022 for corresponding Chinese Application No. 202080001978.3, 22 pages.

* cited by examiner

SELF-MOVING DEVICE, OBSTACLE DETECTION METHOD THEREOF, AND OBSTACLE DETECTION MODULE

BACKGROUND

This application is a National Stage Application of International Application No. PCT/CN2020/074125, filed on Jan. 31, 2020, which claims benefit of and priority to Chinese Patent Application No. 201910108695.8, filed on Feb. 3, 2019, all of which are hereby incorporated by reference in their entirety for all purposes as if fully set forth herein.

Technical Field

The present embodiments relates to a self-moving device and an obstacle detection method thereof, specifically relates to a self-moving device with a non-contact obstacle detection module, and a non-contact obstacle detection method for a self-moving device, and further relates to a non-contact obstacle detection module.

Related Art

Because self-moving devices can move and work autonomously in a working region without frequent human intervention, the self-moving devices can free a user from boring labor, and are increasingly popular with consumers. Common household self-moving devices include an automatic sweeper, an automatic lawn mower, and the like. The self-moving device needs to have a capability of recognizing the working region and a capability of recognizing an obstacle when moving and working autonomously in the working region. To make the self-moving device accurately recognize an obstacle and make the self-moving device adopt a reasonable obstacle avoidance measure after recognizing the obstacle is a technical problem that needs to be resolved when the self-moving device is more intelligent. Non-contact obstacle detection enables the self-moving device to recognize the obstacle and respond without colliding with the obstacle, which is especially beneficial to the safety of a user. Therefore, it has received more and more attention.

SUMMARY

The problem to be resolved by the present embodiments is to provide a self-moving device that accurately recognizes an obstacle through non-contact obstacle detection, especially recognizes a location of the obstacle, and makes an obstacle avoidance response timely and appropriately.

A technical solution adopted in the present invention to resolve the existing technical problem is as follows:

A self-moving device is provided, moving and working in a working region, and including a housing, a moving module, and a working module, where the moving module and the working module are mounted on the housing; the self-moving device further includes at least two non-contact obstacle detection modules, respectively located on two sides of the housing in a moving direction, and configured to transmit detection signals and receive reflected detection signals, to detect an obstacle in the moving direction of the self-moving device; the obstacle detection modules include axes in signal transmitting directions, and the obstacle detection modules are disposed opposite to each other, so that projections of the axes on a working plane intersect in front of the obstacle detection modules; the self-moving device further includes a control module, configured to control the moving module to drive the self-moving device to move and control the working module to perform a work task; the control module turns on each obstacle detection module in a time-sharing manner to transmit the detection signal, and turns on each obstacle detection module in the time-sharing manner to receive the reflected detection signal, to obtain detection data; and the control module determines a location of the obstacle according to the obtained detection data, a corresponding identity of the obstacle detection module that transmits the detection signal, and a corresponding identity of the obstacle detection module that receives the detection signal, and controls the self-moving device to move and/or turn to avoid the obstacle, and the identities of the obstacle detection modules are related to positions of the obstacle detection modules relative to the housing.

In an embodiment, the obstacle detection modules are disposed opposite to each other, so that the projections of the axes on the working plane intersect in front of the obstacle detection modules, and a detection signal transmitted by one obstacle detection module can be at least partially received by the other obstacle detection module after being reflected.

In an embodiment, the turning on, by the control module, each obstacle detection module in the time-sharing manner to receive the reflected detection signal includes: turning on each obstacle detection module in the time-sharing manner to receive the detection signal; or in response to the detection signal transmitted in the time-sharing manner, enabling, in the time-sharing manner, processing of the detection signal received by each obstacle detection module.

In an embodiment, the control module turns on each obstacle detection module in the time-sharing manner to transmit the detection signal and turns on each obstacle detection module in the time-sharing manner to receive the reflected detection signal, to form different combinations of transmission and receiving of the detection signals; and the control module determines the location of the obstacle according to the detection data obtained by at least two different combinations of transmission and receiving of the detection signals.

In an embodiment, the control module determines the location of the obstacle according to the detection data obtained within one period implemented by the different combinations of transmission and receiving of the detection signals.

In an embodiment, the control module turns on each obstacle detection module in the time-sharing manner to transmit the detection signal and turns on each obstacle detection module in the time-sharing manner to receive the reflected detection signal in the following manner, to form different combinations of transmission and receiving of the detection signals: selecting, by the control module, one of the obstacle detection modules to be turned on to transmit the detection signal and selecting one of the obstacle detection modules to be turned on to receive the detection signal, where the same obstacle detection module is turned on to transmit the detection signal and receive the detection signal or different obstacle detection modules are turned on to transmit the detection signal and receive the detection signal.

In an embodiment, a detection region of the obstacle detection module is divided into a plurality of sub-regions; the determining, by the control module, a location of the obstacle according to the obtained detection data, a corresponding identity of the obstacle detection module that transmits the detection signal, and a corresponding identity of the obstacle detection module that receives the detection signal includes: determining a sub-region in which the obstacle is located according to the obtained detection data, the corresponding identity of the obstacle detection module that transmits the detection signal, and the corresponding identity of the obstacle detection module that receives the detection signal; and the sub-regions include a left region and a right region in the moving direction of the self-moving device.

In an embodiment, that the identities of the obstacle detection modules are related to positions of the obstacle detection modules relative to the housing includes: defining the obstacle detection module on a left side of the housing as a left obstacle detection module, and defining the obstacle detection module on a right side of the housing as a right obstacle detection module.

In an embodiment, the sub-regions further include a middle region in the moving direction of the self-moving device; if the left obstacle detection module transmits a detection signal, and the control module can obtain detection data received by the left obstacle detection module, it is determined that the obstacle is located in the right region or the middle region; and if the right obstacle detection module transmits a detection signal, and the control module can obtain detection data received by the right obstacle detection module, it is determined that the obstacle is located in the left region or the middle region.

In an embodiment, if the detection data includes the detection signal transmitted by the left obstacle detection module and the detection signal received by the left obstacle detection module and does not comprise the detection signal transmitted by the right obstacle detection module and the detection signal received by the right obstacle detection module, it is determined that the obstacle is located in a right first region in the moving direction of the self-moving device, and the right region includes the right first region; and if the detection data includes the detection signal transmitted by the right obstacle detection module and the detection signal received by the right obstacle detection module and does not comprise the detection signal transmitted by the left obstacle detection module and the detection signal received by the left obstacle detection module, it is determined that the obstacle is located in a left first region in the moving direction of the self-moving device, and the left region includes the left first region.

In an embodiment, if valid detection data is from the detection signal received by the left obstacle detection module or the reflected detection signal transmitted by the left obstacle detection module, it is determined that the obstacle is located in a right first region in the moving direction of the self-moving device, and the right region includes the right first region; and if the valid detection data is from the detection signal received by the right obstacle detection module and the reflected detection signal transmitted by the right obstacle detection module, it is determined that the obstacle is located in a left first region in the moving direction of the self-moving device, and the left region includes the left first region.

In an embodiment, if the detection data is only from the detection signal transmitted by the left obstacle detection module and the detection signal received by the left obstacle detection module, it is determined that the obstacle is located in a right second region in the moving direction of the self-moving device, and the right region includes the right second region; and if the detection data is only from the detection signal transmitted by the right obstacle detection module and the detection signal received by the right obstacle detection module, it is determined that the obstacle is located in a left second region in the moving direction of the self-moving device, and the left region includes the left second region.

In an embodiment, the detection data includes a distance parameter; if a distance parameter of the detection signal received by the left obstacle detection module is greater than a distance parameter of the detection signal received by the right obstacle detection module, it is determined that the obstacle is located in the right region; and if the distance parameter of the detection signal received by the left obstacle detection module is less than the distance parameter of the detection signal received by the right obstacle detection module, it is determined that the obstacle is located in the left region.

In an embodiment, the sub-regions further include a middle region in the moving direction of the self-moving device; and if each obstacle detection module transmits the detection signal, and the control module can obtain both the detection data received by the same obstacle detection module and the other obstacle detection module, it is determined that the obstacle is located in the middle region.

In an embodiment, the control module further determines whether the detection data meets a preset threshold and controls, in response to that at least one piece of the detection data meets the preset threshold, the self-moving device to move and/or turn to avoid the obstacle.

In an embodiment, the detection data includes a signal strength parameter, the preset threshold includes a preset strength threshold, and the determining whether the detection data meets a preset threshold includes: determining whether the signal strength parameter is greater than the preset strength threshold.

In an embodiment, the detection data includes a distance parameter, the preset threshold includes a preset distance threshold, and the determining whether the detection data meets a preset threshold includes: determining whether the distance parameter is less than the preset distance threshold.

In an embodiment, a region in which the obstacle is located is divided into a plurality of sub-regions in the moving direction of the self-moving device according to the detection data, the corresponding identity of the obstacle detection module that transmits the detection signal, and the corresponding identity of the obstacle detection module that receives the detection signal; the sub-regions include a left region, a right region, and a middle region; and the left region and the right region include an $N^{th}$ region relatively away from the middle region and an $(N-1)^{th}$ region relatively close to the middle region, N being an integer greater than 1; and the preset distance threshold is related to a sub-region in which the obstacle is located: a preset distance threshold of the middle region is greater than preset distance thresholds of the left region and the right region; and a preset distance threshold of the $(N-1)^{th}$ region is greater than a preset distance threshold of the $N^{th}$ region.

In an embodiment, the detection data includes a distance parameter, a deceleration parameter and/or an angle parameter of which the self-moving device moves and/or turns to avoid the obstacle is related to the distance parameter, and the deceleration parameter and/or the angle parameter increases as the distance parameter decreases.

In an embodiment, when the control module determines that an abnormal obstacle is detected, the control module controls, in response to a deceleration parameter and/or an angle parameter of a minimum distance parameter, the self-moving device to move and/or turn to avoid the obstacle; and the detecting an abnormal obstacle includes detecting an intrusion of an obstacle or detecting a dynamic obstacle.

In an embodiment, a detection region of the obstacle detection module is divided into a plurality of sub-regions, and the sub-regions include at least one of a left region, a right region, and a middle region in the moving direction of the self-moving device; the determining, by the control module, a location of the obstacle according to the obtained detection data, a corresponding identity of the obstacle detection module that transmits the detection signal, and a corresponding identity of the obstacle detection module that receives the detection signal includes: determining a sub-region in which the obstacle is located according to the obtained detection data, the corresponding identity of the obstacle detection module that transmits the detection signal, and the corresponding identity of the obstacle detection module that receives the detection signal; and if determining that the obstacle is located in the right region in the moving direction of the self-moving device, the control module controls the self-moving device to turn left to avoid the obstacle; if determining the obstacle is located in the left region in the moving direction of the self-moving device, the control module controls the self-moving device to turn right to avoid the obstacle; and if determining that the obstacle is located in the middle region in the moving direction of the self-moving device, the control module controls the self-moving device to turn right or left randomly to avoid the obstacle.

In an embodiment, that the self-moving device moves and/or turns to avoid the obstacle includes causing the self-moving device to continue to move and turn.

In an embodiment, that the self-moving device moves and/or turns to avoid the obstacle includes slowing down the self-moving device.

In an embodiment, the obstacle detection modules are detachably mounted on the housing of the self-moving device.

In an embodiment, the obstacle detection modules include ultrasonic sensors.

The present invention further provides a self-moving device, moving and working in a working region and including a housing, a moving module, and a working module, where the moving module and the working module are mounted on the housing; the moving module includes a drive and a first driving circuit connected to the drive; the self-moving device further includes a non-contact obstacle detection module, configured to transmit a detection signal and receive a reflected detection signal, to detect an obstacle in a moving direction of the self-moving device; the obstacle detection module includes a second driving circuit for driving the obstacle detection module to transmit the detection signal; the self-moving device includes at least two obstacle detection modules; the self-moving device includes a transverse direction parallel to the working plane and perpendicular to the moving direction, and projections of the two obstacle detection modules on the housing have transverse offsets; the self-moving device further includes a control circuit, configured to execute a second driving circuit instruction to cause the obstacle detection module to transmit the detection signal, monitor the detection signal received by the obstacle detection module, and obtain detection data; and execute a first driving circuit instruction to cause the moving module to drive the self-moving device to change a moving manner to avoid the obstacle; the self-moving device further includes an obstacle avoidance program module, providing the first driving circuit instruction to avoid the obstacle; the obstacle avoidance program module defines identities of the obstacle detection modules, and the identities of the obstacle detection module are associated with projection positions of the obstacle detection modules on the housing; a determining result of a location of the obstacle is obtained according to the detection data, the identity of the obstacle detection module that transmits the detection signal, and the identity of the obstacle detection module that receives the detection signal that correspond to the detection data; the first driving circuit instruction is provided according to the location of the obstacle; and the obstacle avoidance program module further provides the second driving circuit instruction to sequentially transmit the detection signal and monitor the received detection signal by sequentially enabling receiving of the detection signal.

In an embodiment, the obstacle detection module sequentially transmits the detection signal, and sequentially enables receiving of the detection signal, to form different combinations of transmission and receiving of the detection signals; and the obstacle avoidance program module obtains the location of the obstacle according to the detection data obtained by at least two different combinations of transmission and receiving of the detection signals.

In an embodiment, the program module monitors the received detection signal in the following manner to form different combinations of transmission and receiving of the detection signals: when one obstacle detection module is turned on to transmit the detection signal, controlling the same obstacle detection module to be turned on to receive the detection signal or controlling the other obstacle detection module to be turned on to receive the detection signal.

The present invention further provides an obstacle detection method for a self-moving device, where the self-moving device includes a housing, a moving module, and a working module, and the moving module and the working module are mounted on the housing; the self-moving device further includes at least two non-contact obstacle detection modules, disposed on two sides of the housing in a moving direction; the obstacle detection modules include axes in signal transmitting directions, and the obstacle detection modules are disposed opposite to each other, so that projections of the axes on a working plane intersect in front of the obstacle detection modules; and the detection method includes the following steps: controlling one of the obstacle detection modules to be turned on to transmit a detection signal, and controlling the same obstacle detection module or the other obstacle detection module to be turned on to receive a reflected detection signal; obtaining detection data based on the received detection signal; determining a location of an obstacle according to the obtained detection data, a corresponding identity of the obstacle detection module that transmits the detection signal, and a corresponding identity of the obstacle detection module that receives the detection signal, where the identities of the obstacle detection modules are related to positions of the obstacle detection modules relative to the housing; and controlling, according to the location of the obstacle, the self-moving device to move and/or turn to avoid the obstacle.

In an embodiment, the location of the obstacle is determined according to at least two different combinations of transmission and receiving of the detection signals.

The present invention further provides a non-contact obstacle detection module mounted on a housing of a self-moving device, where when the self-moving device moves and works in a working region, the obstacle detection module transmits a detection signal and receives a reflected detection signal, to detect an obstacle in a moving direction of the self-moving device; at least two obstacle detection modules are configured to be respectively located on two sides of the housing of the self-moving device in the moving direction; the at least two obstacle detection modules are disposed opposite to each other, so that regions of transmitting and/or receiving the detection signals at least partially overlap, and the detection signal transmitted by one obstacle detection module can be at least partially received by the other obstacle detection module after being reflected; the transmission of the detection signal by each obstacle detection module is enabled in a time-sharing manner, and the receiving of the reflected detection signal is also enabled in a time-sharing manner; and the self-moving device determines a location of an obstacle by using detection data corresponding to the detection signal received by the obstacle detection module, information about a corresponding identity of the obstacle detection module for transmitting the detection signal and a corresponding identity of the obstacle detection module for receiving the detection signal, so that the self-moving device moves and/or turns to avoid the obstacle, and the identities of the obstacle detection modules are related to locations of the obstacle detection modules relative to the housing of the self-moving device.

In an embodiment, the obstacle detection modules include axes in a signal transmitting direction, and the obstacle detection modules are disposed opposite to each other, so that projections of the axes on a working plane of the self-moving device intersect in front of the obstacle detection modules.

In an embodiment, the self-moving device determines the location of the obstacle according to the detection data provided by at least two different combinations of transmission and receiving of the detection signals of the obstacle detection modules.

The present invention further provides a self-moving device, moving and working in a working region, and including a housing, a moving module, and a working module, where the moving module and the working module are mounted on the housing; the self-moving device further includes at least two non-contact obstacle detection modules, respectively located on two sides of the housing in a moving direction, and configured to transmit detection signals and receive reflected detection signals, to detect an obstacle in the moving direction of the self-moving device; the obstacle detection modules include axes in signal transmitting directions, and the obstacle detection modules are disposed opposite to each other, so that projections of the axes on a working plane intersect in front of the obstacle detection modules; the self-moving device further includes a control module, configured to control the moving module to drive the self-moving device to move and control the working module to perform a work task; the at least two obstacle detection modules form different combinations of transmission and receiving of the detection signals; the control module determines a location of the obstacle according to detection data obtained by at least two different combinations of transmission and receiving of the detection signals and an identity of the obstacle detection module that transmits the detection signal and an identity of the obstacle detection module that receives the detection signal that correspond to the detection data, to control the self-moving device to move and/or turn to avoid the obstacle, and the identities of the obstacle detection modules are related to positions of the obstacle detection modules relative to the housing.

Compared with the prior art, the present invention has the following beneficial effects: axes of obstacle detection modules intersect, and each obstacle detection module is turned on in a time-sharing manner to transmit a detection signal, and each obstacle detection module is turned on in the time-sharing manner to receive a reflected detection signal, to form different combinations of transmission and receiving of the detection signals; a combination of detection data is formed according to the detection signals received in different combinations; a location of an obstacle is determined according to the combination of detection data, so that the self-moving device adopts a corresponding obstacle avoidance measure to avoid the obstacle. The self-moving device according to the embodiments of the present invention recognizes the obstacle without colliding with the obstacle, thereby improving the safety of the operation of the self-moving device, especially the protection of a human body and another living body. The self-moving device according to the embodiments of the present invention can accurately and effectively recognize the location of the obstacle. Therefore, the self-moving device continuously moves and turns rather than stops or moves back to avoid the obstacle, the working efficiency of the self-moving device is improved, the moving and working of the self-moving device is smoother, and performance is more intelligent, thereby improving the user experience.

BRIEF DESCRIPTION OF THE DRAWINGS

The foregoing objectives, technical solutions, and beneficial effects of the present invention can be achieved by using the following accompanying drawings.

DETAILED DESCRIPTION

Figure 1:
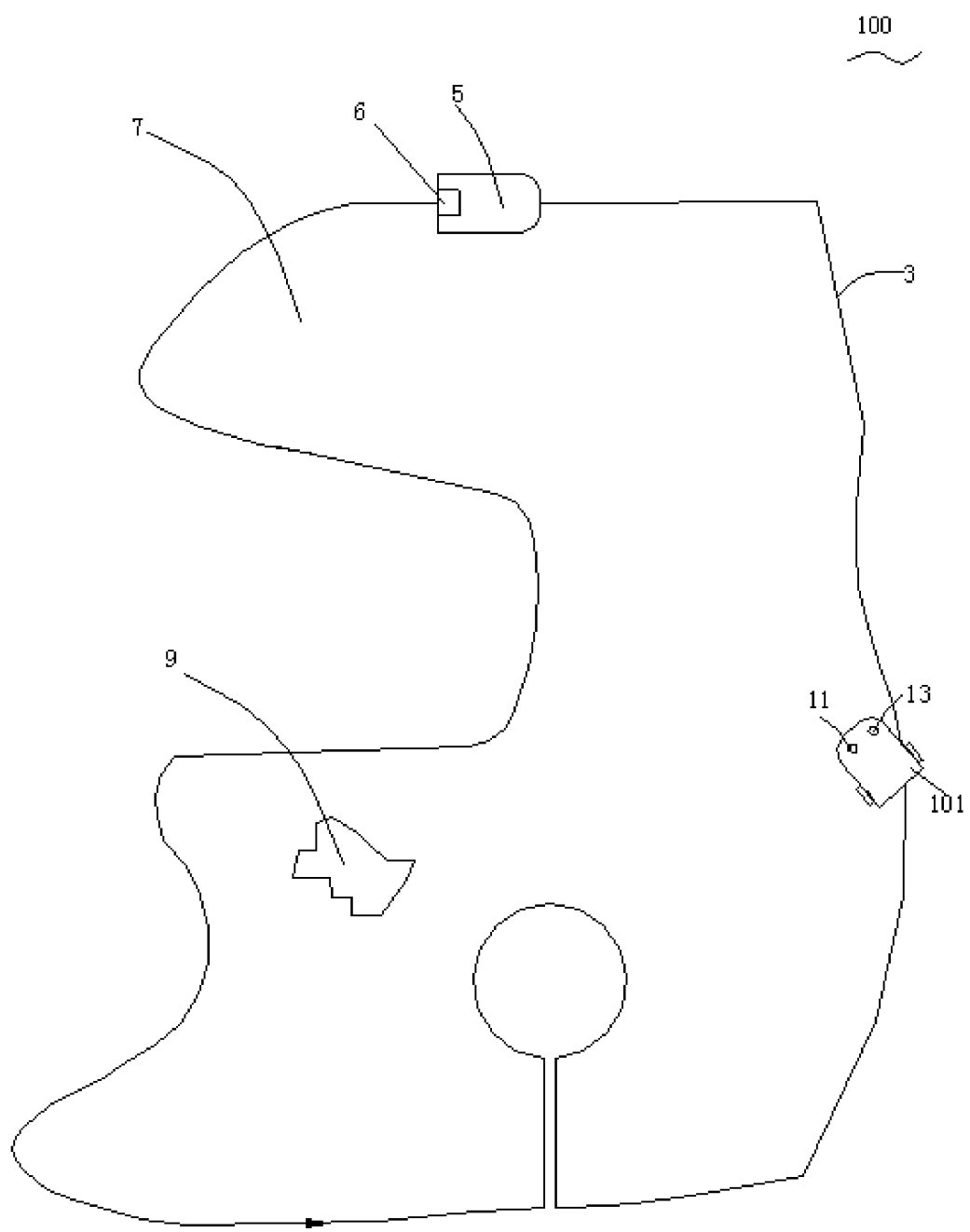
FIG. 1 is a schematic diagram of an automatic working system according to some embodiments of the present invention.

FIG. 1 is a schematic diagram of an automatic working system 100 according to an embodiment of the present invention. The automatic working system 100 includes a self-moving device 101, a boundary system, a docking station, and the like. The self-moving device 101 moves and works in a working region 7 defined by a boundary. The boundary includes a physical boundary line or may be a virtual boundary line. The boundary may be a natural boundary formed by a wall, a fence, or the like. The boundary system is configured to cause the self-moving device 101 to recognize a boundary of the working region. In an embodiment shown in FIG. 1, the boundary system includes a boundary signal generator 6 and a boundary cable 3 connected to the boundary signal generator. The boundary cable 3 is laid along the boundary of the working region. The boundary cable 3 transmits a current signal transmitted from the boundary signal generator 6 to generate a magnetic field signal in a surrounding space. The magnetic field signal may be detected by a magnetic field detection sensor disposed on the self-moving device 101 to recognize the inside and outside of the working region. For a boundary signal recognition method, reference may be made to the PCT patent application with publication number WO2017080408A1, and details are not described herein again. Certainly, the boundary system may be alternatively a passive apparatus that does not require a signal generator, for example, a magnetic strip or a magnetic nail disposed on the boundary. In an embodiment, the boundary system includes a positioning device, and the positioning device may be a satellite positioning device, for example, a positioning device disclosed in the PCT patent application with publication number WO2017133707A1; or may include a plurality of base stations disposed in the working region. The self-moving device communicates with the base stations to obtain positioning coordinates, and a communication manner includes UWB, ultrasonic, or the like. In an embodiment, the boundary system includes a surface recognition sensor, and a sensor type includes, but is not limited to, one or more of capacitance, infrared, visible light, and radar. In an embodiment, the boundary system may also be an infrared/laser navigation system, for example, an infrared/laser navigation system disclosed in the US Patent with publication number U.S. Pat. No. 9,529,363B2. The boundary system may be alternatively in another common form in the field of self-moving devices, and details are not described herein again. In this embodiment, the boundary includes an outer boundary and an inner boundary. The outer boundary is, for example, a boundary between the working region and a non-working region at the periphery of the working region, and the inner boundary is, for example, a contour line of an isolated island formed by a pond, a flower bed, a sofa, or the like in the working region or a contour line of an excluded region. In this embodiment, the docking station is used for the self-moving device to dock and replenish electric energy. Therefore, the docking station may be specifically a charging station 5. When detecting that an amount of power of the self-moving device is insufficient, the self-moving device 101 returns to the docking station to replenish the electric energy.

Figure 2:
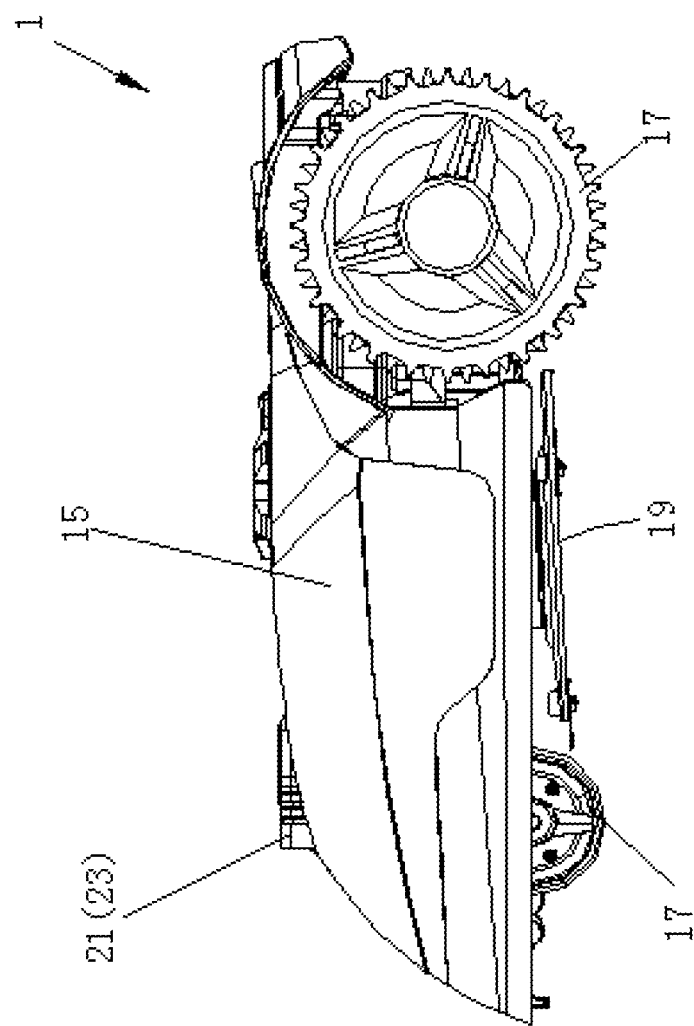
FIG. 2 is a schematic structural diagram of an automatic lawn mower according to some embodiments of the present invention.

The self-moving device includes, but is not limited to, one or more of the following: an automatic lawn mower, an automatic snow sweeper, another automatic gardening device, an automatic sweeper, an automatic mopping machine, an automatic patrol aircraft, an automatic security robot, and another unattended device. In this embodiment, an automatic lawn mower is used as an example for description. FIG. 2 is a schematic structural diagram of an automatic lawn mower 1. The automatic lawn mower 1 includes a housing 15, a moving module 17, a working module 19, an energy module (not shown), a control module (not shown), and the like. The moving module 17 is mounted on the housing 15 to drive the automatic lawn mower 1 to move. In this embodiment, the moving module 17 has two rear wheels and one or two front wheels, where the rear wheels are driving wheels, the two rear wheels are independently driven by two driving motors, and the front wheel is a driven wheel. In another embodiment, each of the front wheel and rear wheels may be driven by an independent driving motor. In another embodiment, the moving module 17 may include tracks. In this embodiment, the working module 19 is mounted on the housing 15 and includes a cutter head, a plurality of blades mounted on the cutter head, and a cutting motor that drives the cutter head to rotate to perform a cutting work. In an embodiment, the working module may further include an edge trimming unit such as a grass trimming head, pruning shears, or the like. In this embodiment, the energy module includes one or more battery packs for providing energy for moving and working of the automatic lawn mower 1. The battery pack is fixedly mounted on the housing 15 of the automatic lawn mower 1, or is detachably connected to the housing 15 of the automatic lawn mower 1. In this embodiment, the control module controls the moving module 17 to drive the automatic lawn mower 1 to move, and controls the working module 19 to perform a work task. The control module includes a control circuit. The control circuit includes a processor and a memory. In this embodiment, the control circuit includes a main control circuit and a dedicated control circuit, and further includes a driving circuit of each execution component/power component. The dedicated control circuit controls working of a sensor on the self-moving device and/or processes sensor data, and transmits the processed data to the main control circuit, and the main control circuit controls moving and/or working of the self-moving device. The dedicated control circuit and the main control circuit may be integrated in a main control panel.

With reference to FIG. 1 and FIG. 2, when the automatic lawn mower 1 according to this embodiment works, the automatic lawn mower departs from the charging station 5 and enters the working region 7 to automatically move on a lawn and perform a mowing work. There are usually a plurality of obstacles (an obstacle 9 is one of examples) in the working region 7. These obstacles may be fixed obstacles such as trees, fences, and flower beds in the lawn, or users, children, pets, or other living bodies who suddenly break into the lawn, or may be other devices working in the working region. When the automatic lawn mower 1 encounters an obstacle, the automatic lawn mower needs to recognize the obstacle and responds to stay away from the obstacle. Otherwise, the automatic lawn mower 1 stops at the obstacle, resulting in an abnormal operation of the machine. A method for recognizing an obstacle is to detect a collision between the automatic lawn mower 1 and the obstacle, and after the collision is detected, the automatic lawn mower moves back and turns to stay away from the obstacle. The automatic lawn mower 1 according to this embodiment detects the obstacle by using non-contact obstacle detection modules 11 and 13, and the automatic lawn mower 1 can detect the obstacle within a particular distance from the obstacle and drive away from the obstacle.

Figure 3A:
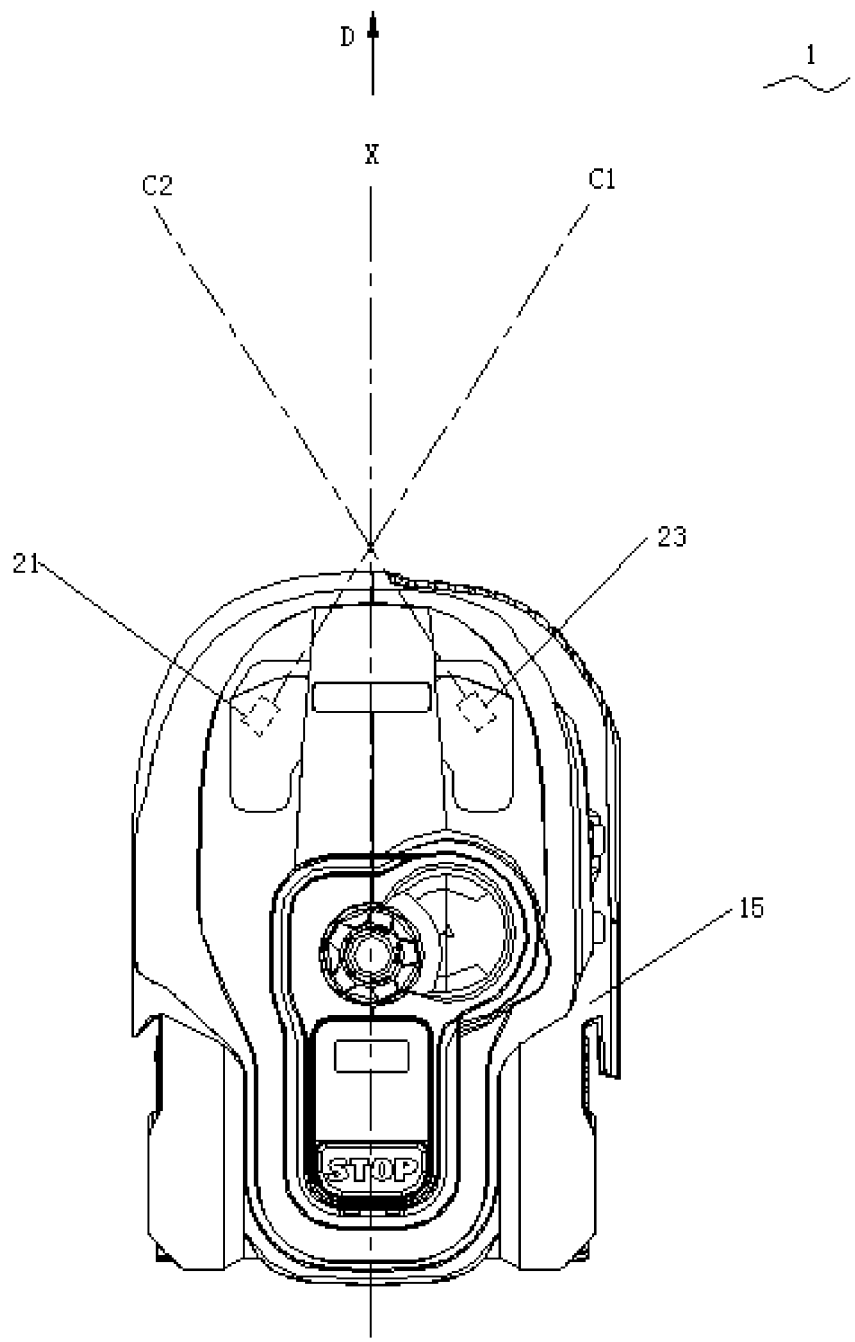
FIG. 3(a) and FIG. 3(b) are schematic diagrams in which ultrasonic sensors are disposed on an automatic lawn mower according to some embodiments of the present invention.
Figure 3B:
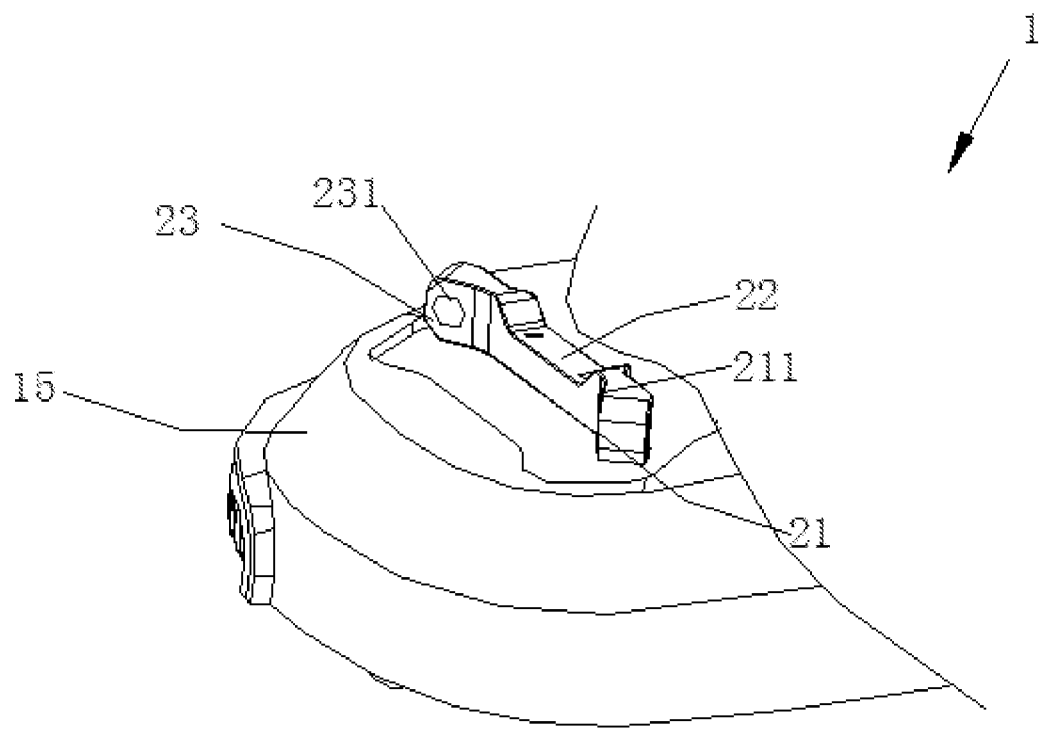

Specifically, as shown in FIG. 3(a) and FIG. 3(b), in this embodiment, the automatic lawn mower 1 includes at least two non-contact obstacle detection modules, which are respectively located on two sides of the housing 15 in a moving direction (a direction indicated by an arrow D in FIG. 3(a)) and configured to transmit detection signals and receive reflected detection signals to detect an obstacle in the moving direction of the automatic lawn mower 1. The non-contact obstacle detection modules include ultrasonic sensors, infrared sensors, or the like. The obstacle detection module includes a detection signal transmitter and a detection signal receiver. The detection signal transmitter and the detection signal receiver may be integrated, or may be separate components disposed adjacent to each other. In this embodiment, the non-contact obstacle detection modules include the ultrasonic sensors (which is also referred to as ultrasonic probes below) 21 and 23, configured to transmit the detection signals and receive the detection signals. As shown in FIG. 3(a), the housing 15 of the automatic lawn mower 1 includes a vertical axis X in the moving direction, and the vertical axis X divides the housing 15 into a left side and a right side in the moving direction. In this embodiment, the automatic lawn mower 1 includes two ultrasonic probes 21 and 23, which are respectively located on the left side and the right side of the housing 15. The ultrasonic probes 21 and 23 are disposed on an upper surface of the housing 15 and on a front part of the housing 15 and have a particular distance from a front edge of the housing 15. The ultrasonic probes 21 and 23 include axes C1 and C2 in signal transmitting directions. The two ultrasonic probes 21 and 23 are disposed opposite to each other, so that projections of the axes C1 and C2 on a working plane intersect in front of the probes 21 and 23. That is, a detection surface 211 (231) of each ultrasonic probe 21 (23) is set to deflect toward the other ultrasonic probe 23 (21) and faces the front of the moving direction. The detection surfaces 211 and 231 of the ultrasonic probes 21 and 23 are surfaces for transmitting and receiving the detection signals. An advantage of this configuration is that a detection signal transmitted by one ultrasonic probe can be at least partially received by the other ultrasonic probe after being reflected.

Certainly, in another embodiment, the axes C1 and C2 of the ultrasonic probes 21 and 23 may be alternatively parallel to the probes or intersect at the rear of the probes 21 and 23, and regions in which the ultrasonic probes 21 and 23 transmit and/or receive the detection signals at least partially overlap.

In this embodiment, the obstacle detection modules 11 and 13 are detachably connected to the housing of the self-moving device 101. In another embodiment, the obstacle detection modules 11 and 13 may be alternatively fixedly connected to the housing of the self-moving device 101.

As shown in FIG. 3(*b*), in this embodiment, the two ultrasonic probes 21 and 23 are connected by a bracket 22, and the bracket 22 is mounted on the housing 15. In another embodiment, the two ultrasonic probes 21 and 23 may be separated and are respectively mounted on the housing 15. The two ultrasonic probes 21 and 23 are respectively located on the left side and the right side of the housing 15 and may be directly connected to the left side and the right side of the housing 15; or projections of the probes on the housing 15 may be respectively located on the left side and the right side of the housing 15. For example, when the ultrasonic probes 21 and 23 are connected to the housing 15 by the bracket 22, the two probes 21 and 23 do not need to be directly connected to the left side or the right side of the housing 15, but are connected to the housing 15 by the bracket 22, and the projections of the probes are located on the left side and the right side of the housing 15.

In this embodiment, the two ultrasonic probes 21 and 23 are symmetrical with respect to the vertical axis X of the housing 15, that is, a distance between the probe 21 and the vertical axis X of the housing 15 is substantially equal to a distance between the probe 23 and the vertical axis X of the housing, and distances between the two probes and a front end (or a rear end) of the housing 15 are substantially equal. In another embodiment, the two ultrasonic probes may not need to be symmetrical with respect to the vertical axis X of the housing 15. For example, one ultrasonic probe may be disposed forward or backward relative to the other ultrasonic probe (the moving direction of the automatic lawn mower 1 is used as reference for front and rear). The two ultrasonic probes may alternatively not need to be located on two sides of the vertical axis X, and only need to satisfy that the projections on the housing 15 have transverse offsets, and the transverse direction refers to a direction parallel to the working plane and perpendicular to the moving direction. According to the relative transverse offsets of the ultrasonic probes, a left probe and a right probe are formed. In some embodiments, the housing may be asymmetrical, so that the housing on the two sides of the vertical axis X may be asymmetrical.

Certainly, in another embodiment, the automatic lawn mower 1 may alternatively include three or more ultrasonic probes located on two sides of the housing 15 or evenly distributed in the transverse direction of the housing 15.

In this embodiment, the obstacle detection modules can not only detect an obstacle in the working region, but also can be configured to detect an obstacle on the boundary of the working region, for example, a fence and a wall that form the outer boundary of the working region.

Figure 4:
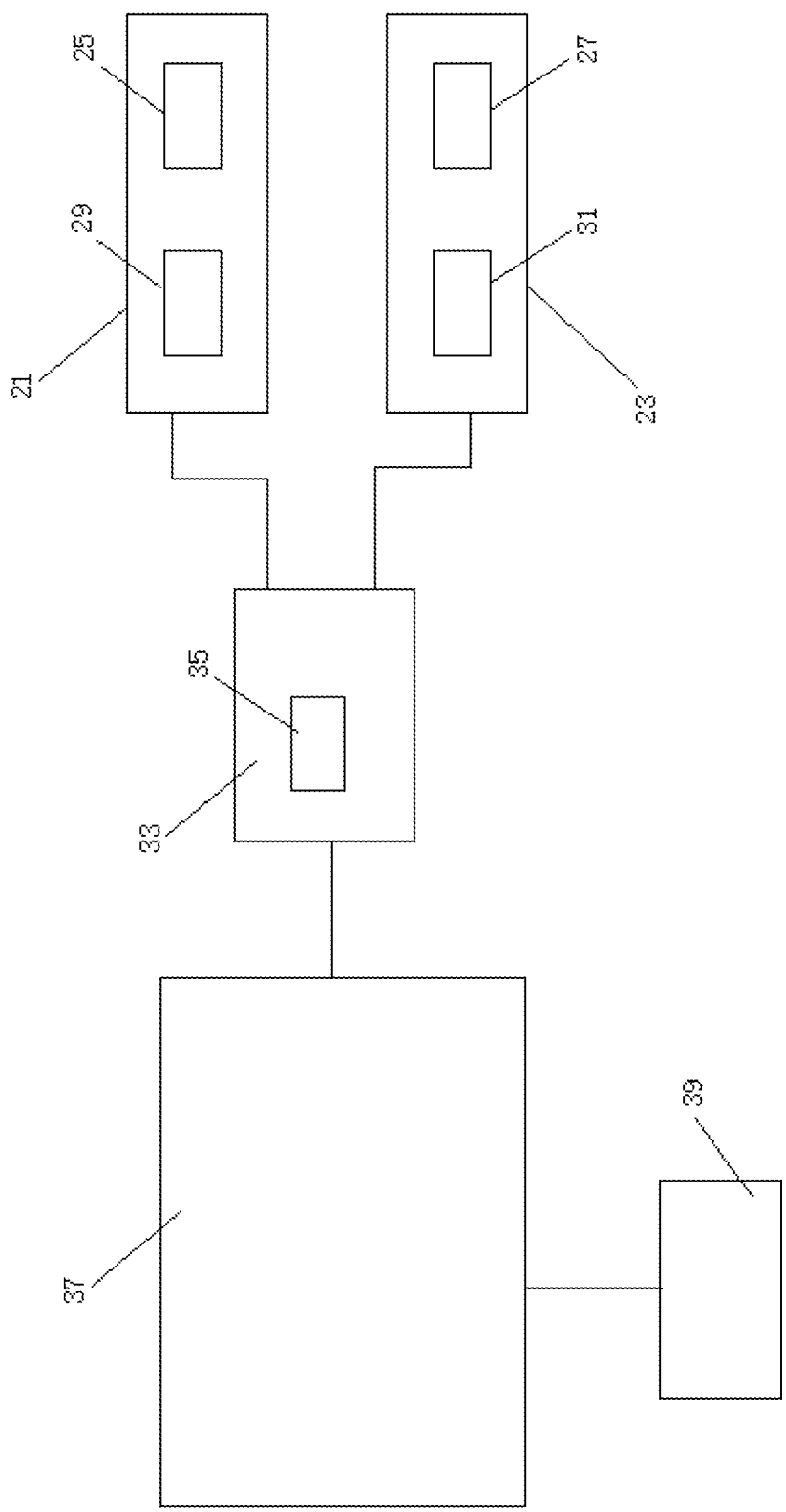
FIG. 4 is a circuit module diagram of an ultrasonic sensor according to some embodiments of the present invention.

FIG. 4 is a circuit module diagram of ultrasonic sensors 21 and 23 according to this embodiment. As shown in FIG. 4, the ultrasonic sensors 21 and 23 include working heads 25 and 27 and sensor circuits 29 and 31. Each of the working heads 25 and 27 and each of the sensor circuits 29 and 31 are packaged in a housing and configured to be located in a preset position of the housing 15 and is located above the housing 15 in this embodiment. An obstacle detection dedicated control circuit 33 is electrically connected to the ultrasonic sensors 21 and 23. The obstacle detection dedicated control circuit 33 controls working of the ultrasonic sensors 21 and 23, and includes functions of turning on and off the ultrasonic sensors 21 and 23 to transmit the detection signal and receive the detection signal. Specifically, the obstacle detection dedicated control circuit 33 includes a second driving circuit 35 that drives the ultrasonic sensors 21 and 23 to transmit the detection signal. The obstacle detection dedicated control circuit 33 includes a processor and a memory. The memory presets a program, and the processor provides a second driving circuit instruction according to the preset program, so that the second driving circuit 35 drives the ultrasonic sensors 21 and 23 to transmit the detection signal in a time-sharing manner. The obstacle detection dedicated control circuit 33 further monitors the detection signal received by the ultrasonic sensors 21 and 23. The obstacle detection dedicated control circuit 33 obtains detection data based on the detection signal received by the ultrasonic sensors 21 and 23, processes the detection data, and generates an instruction signal indicating a moving and/or working manner of the automatic lawn mower 1. The obstacle detection dedicated control circuit 33 is connected to the main control circuit 37 of the automatic lawn mower 1, and transmits the instruction signal to the main control circuit 37, so that the main control circuit 37 controls the moving and/or working of the automatic lawn mower 1. In this embodiment, the moving module 17 of the automatic lawn mower 1 includes a drive and a first driving circuit 39 connected to the drive, and the drive is specifically a driving motor. When the ultrasonic sensors 21 and 23 detect an obstacle in the moving direction of the automatic lawn mower 1, the obstacle detection dedicated control circuit 33 generates a first driving circuit instruction signal that instructs the moving module 17 to change a moving manner, and transmits the first driving circuit instruction signal to the main control circuit 37. The main control circuit 37 sends an instruction to the first driving circuit 39 to execute a first driving circuit instruction, thereby controlling the moving module 17 to change the moving manner.

In this embodiment, the control module turns on each obstacle detection module in a time-sharing manner to transmit a detection signal, and turns on each obstacle detection module in the time-sharing manner to receive a reflected detection signal, to obtain detection data. That is, in this embodiment, transmission and receiving of each obstacle detection module are not simultaneous, but information about the obstacle in the moving direction of the automatic lawn mower 1 is obtained by using a combination relationship between transmission and receiving of different obstacle detection modules. Generally, the ultrasonic sensors configured to detect the obstacle on the self-moving device transmit the detection signal and receive the detection signals at the same time. A signal receiver that receives a signal in a direction usually receives a reflected signal reflected from a signal transmitted by a signal transmitter that transmits a signal in the direction. By using the method, to recognize a location of an obstacle, a plurality of ultrasonic sensors need to be disposed on a front side and two sides of the housing in the moving direction, and the location of the obstacle is determined according to a location of a signal transmitted/received by each sensor. Deposing of the plurality of sensors increases costs of the device, and a plurality of cables led out from each of the plurality of sensors are connected to a mainboard, resulting in a complex circuit.

According to the automatic lawn mower 1 of this embodiment, when one ultrasonic sensor is controlled to transmit a detection signal, one ultrasonic sensor is controlled to receive a detection signal. The detection signals may be transmitted and received by the same ultrasonic sensor or different ultrasonic sensors. That is, in this embodiment, different combinations of ultrasonic sensors for transmitting a detection signal and receiving a detection signal are selected, and each sensor and the each sensor or the other sensor may form a combination of transmission and receiving of the detection signals, thereby forming a set of different combinations of transmission and receiving of signals. In this embodiment, the control module determines the location of the obstacle based on detection data of the set.

In an embodiment, the control module determines the location of the obstacle according to the detection data obtained by at least two different combinations of transmission and receiving of the detection signals.

In an embodiment, the control module determines the location of the obstacle according to the detection data obtained within one period implemented by the different combinations of transmission and receiving of the detection signals.

In an embodiment, the control module determines the location of the obstacle according to the detection data obtained by combinations formed by at least twice transmission of the detection signals. That is, the at least two different combinations of transmission and receiving of the detection signals are the combinations formed under twice transmission of the detection signals. Specifically, the at least two different combinations of transmission and receiving of the detection signals are combinations formed by enabling transmission of the detection signals by different ultrasonic sensors.

Figure 5A:
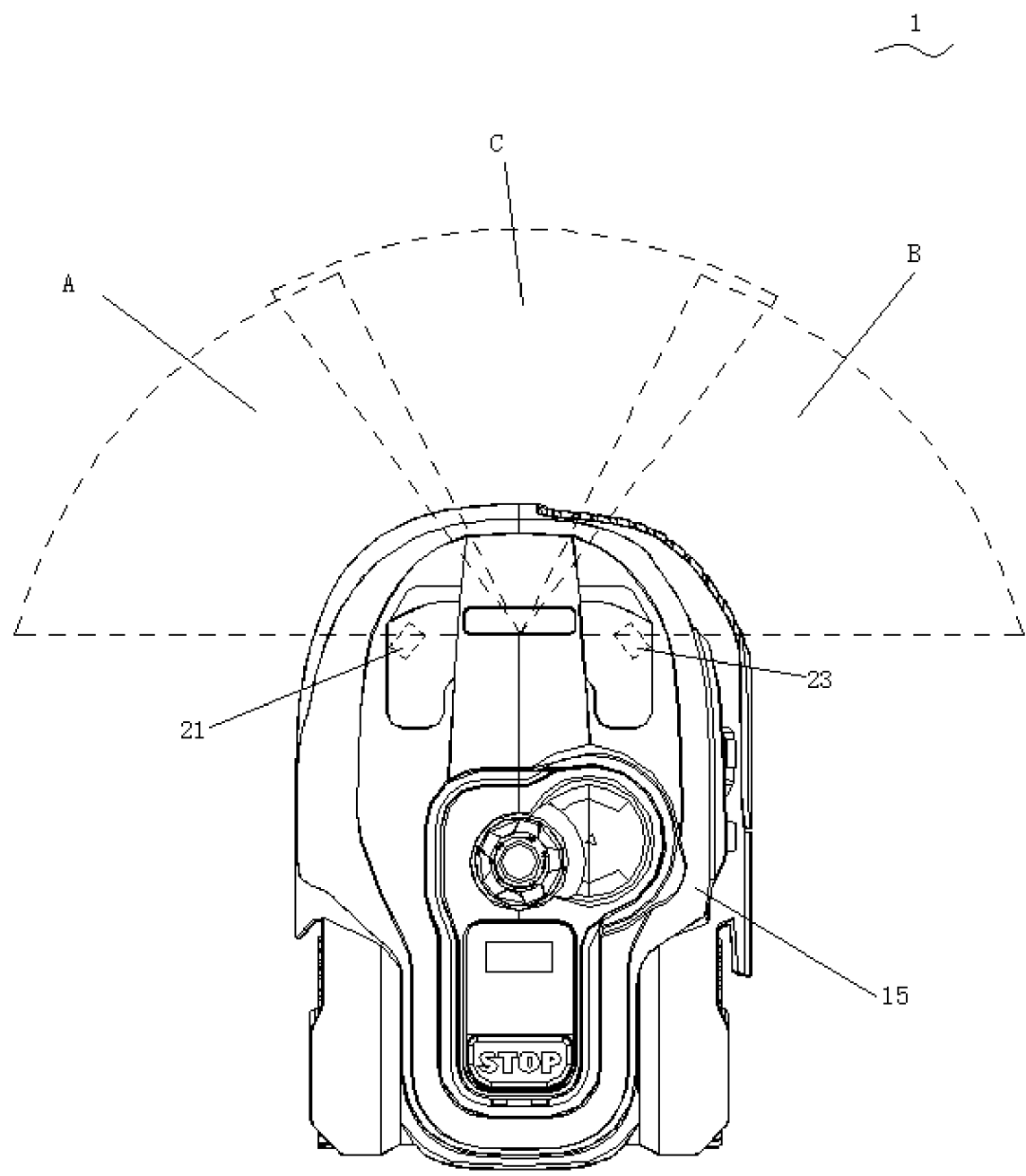
FIG. 5(a), FIG. 5(b), and FIG. 5(c) are schematic diagrams of a detection region of an ultrasonic sensor according to some embodiments of the present invention.
Figure 5B:
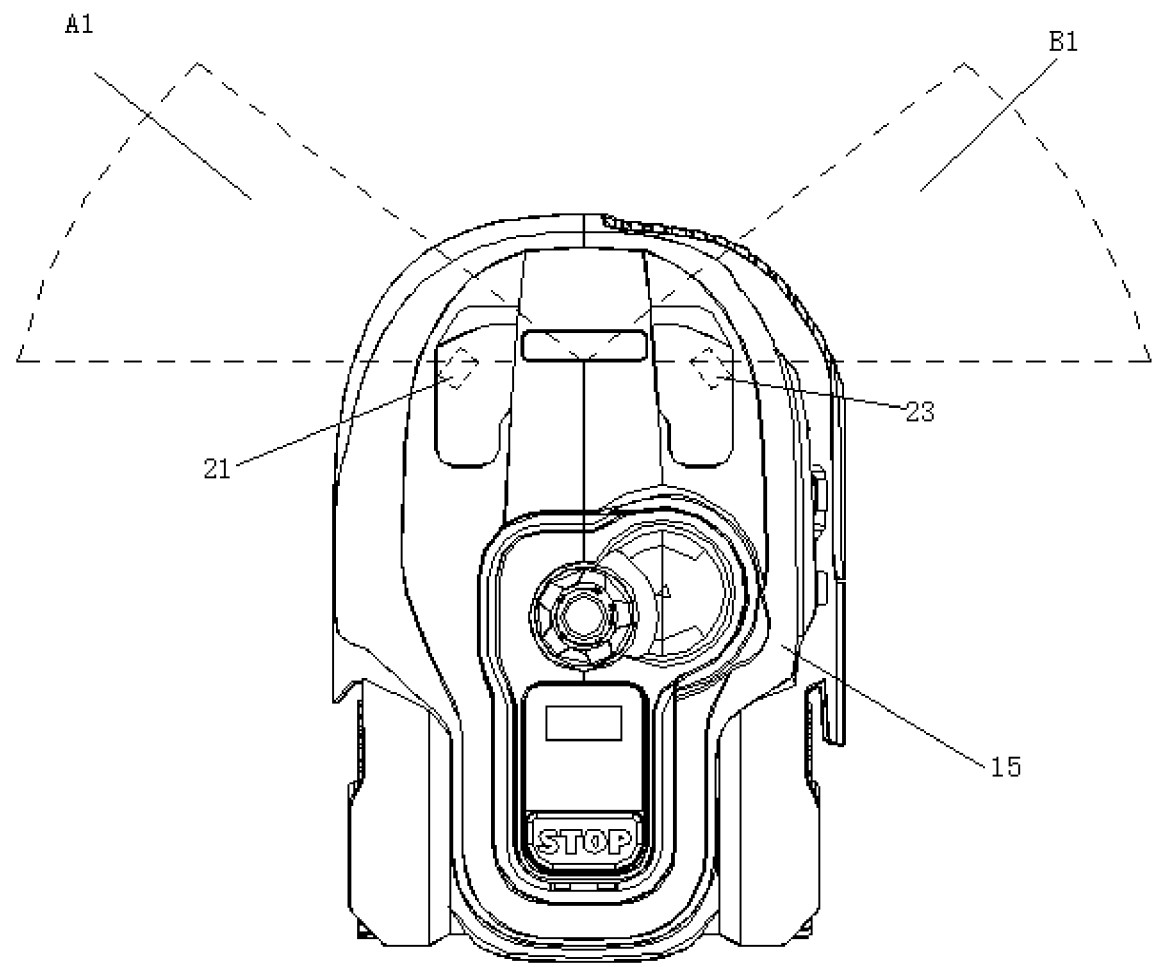
Figure 5C:
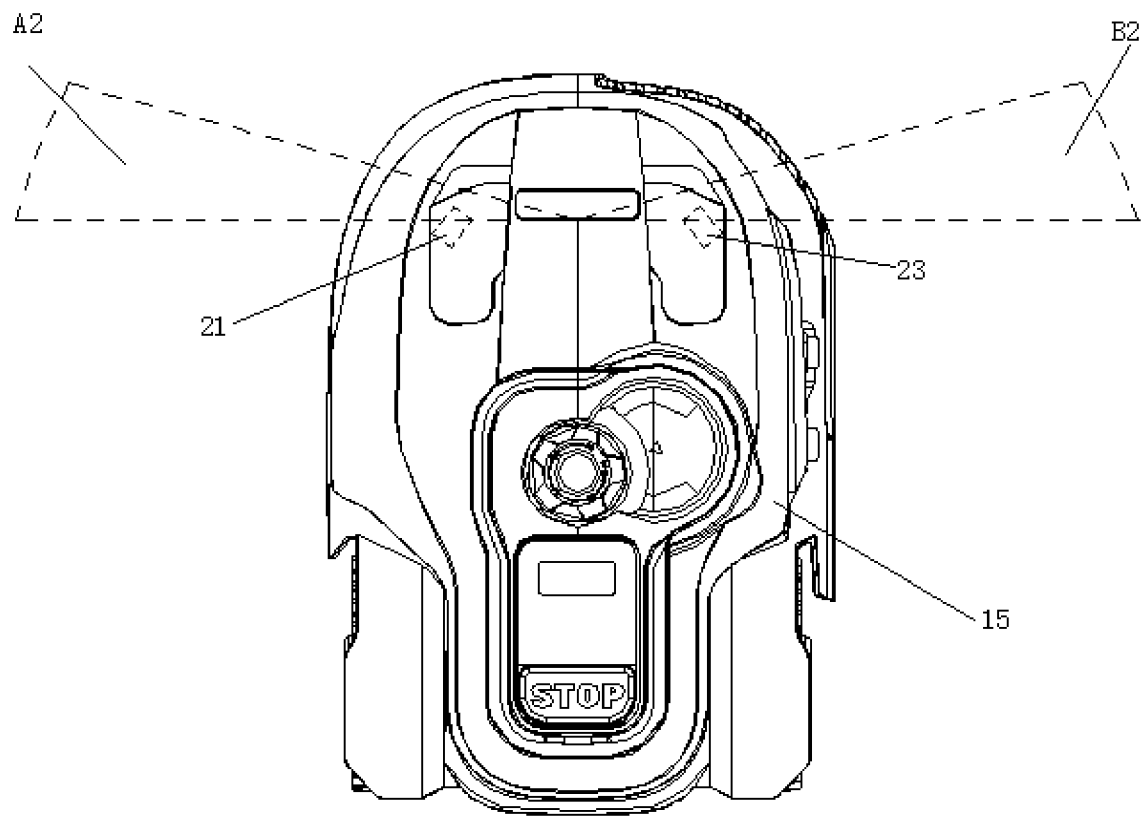

The description is made below based on schematic diagrams of a detection region of an ultrasonic sensor shown in FIG. 5(a), FIG. 5(b), FIG. 5(c).

An obstacle detection module located on the left side of the housing 15 is referred to as a left obstacle detection module, that is, a left ultrasonic sensor 21 (which is also referred to as a left probe below) in this embodiment; and an obstacle detection module located on the right side of the housing is referred to as a right obstacle detection module, that is, a right ultrasonic sensor 23 (which is also referred to as a right probe below) in this embodiment. In other words, identities (the left obstacle detection module and the right obstacle detection module) of the obstacle detection modules are related to positions of the obstacle detection modules relative to the housing 15. When the obstacle detection modules work, the turning on, by the control module, each obstacle detection module in a time-sharing manner to transmit a detection signal, and turning on each obstacle detection module in the time-sharing manner to receive a reflected detection signal includes the following steps, where a sequence of the following steps is not limited.

S1. Control the left probe 21 to be turned on to transmit a detection signal, and control the left probe 21 to be turned on to receive a detection signal, and the right probe 23 to be turned off to receive the detection signal.

S2. Control the left probe 21 to be turned on to transmit the detection signal, and control the right probe 23 to be turned on to receive the detection signal, and the left probe 21 to be turned off to receive the detection signal.

S3. Control the right probe 23 to be turned on to transmit the detection signal, and control the left probe 21 to be turned on to receive the detection signal, and the right probe 23 to be turned off to receive the detection signal.

S4. Control the right probe 23 to be turned on to transmit the detection signal, and control the right probe 23 to be turned on to receive the detection signal, and the left probe 21 to be turned off to receive the detection signal.

In other words, the control module controls the ultrasonic sensors 21 and 23 to sequentially transmit the detection signals, and sequentially enable receiving of the detection signals.

The combination of transmission and receiving of the detection signals form one detection period, and the control module determines the location of the obstacle according to one or more detection data obtained within one period, a corresponding identity of the ultrasonic sensor that transmits the detection signal, and a corresponding identity of the ultrasonic sensor that receives the detection signal.

The foregoing steps are repeated to form a plurality of detection periods.

In this embodiment, the axes C1 and C2 of the two ultrasonic sensors 21 and 23 intersect in front of the ultrasonic sensors 21 and 23, so that the detection signal transmitted by one ultrasonic sensor 21 (23) can be at least partially received by the other ultrasonic sensor 23 (21) after being reflected. Because coverage ranges of detection signals transmitted by the ultrasonic sensors are different, receivable ranges of the detection signals are also different. When an obstacle is located at different orientations in the moving direction of the automatic lawn mower 1, detection results of different combinations are different. The location of the obstacle may be determined according to which ultrasonic sensor transmits a detection signal reflected by the obstacle and which ultrasonic sensor receives the detection signal reflected by the obstacle.

In this embodiment, a detection region of the ultrasonic sensor is divided into a plurality of sub-regions, and the sub-region represents the location of the obstacle. The sub-regions include a left region A, a middle region C, and a right region B in the moving direction of the automatic lawn mower 1. The middle region C covers a region directly in front of the moving direction of the automatic lawn mower 1 and a region within a particular range on the left and the right; the left region A covers a part of a region at the left in the moving direction of the automatic lawn mower 1, which is equivalent to a region in a left "field of view" range when the automatic lawn mower 1 moves forward; and the right region B covers a part of a region at the right in the moving direction of the automatic lawn mower 1, which is equivalent to a region in a right "field of view" range when the automatic lawn mower 1 moves forward. In an embodiment, the left region A, the middle region C, and the right region B can cover a region range of approximately 180 degrees in the moving direction of the automatic lawn mower 1.

In an embodiment, if the left probe 21 transmits a detection signal, and the control module can obtain detection data received by the left probe 21, it is determined that the obstacle is located in the right region B or the middle region C; if the right probe 23 transmits a detection signal, and the control module can obtain detection data received by the right probe 23, it is determined that the obstacle is located in the left region A or the middle region C. Because the detection surface 221 of the left probe 21 is deviated toward the right of the left probe, when the detection signal transmitted by the left probe can be received by the left probe, it means that the obstacle is located in a region in the middle or relatively close to the right in the moving direction of the automatic lawn mower 1, that is, the middle region C or the right region B; and vice versa.

In an embodiment, if the detection data includes a detection signal transmitted by the left probe 21 and a detection signal received by the left probe 21, but does not include a detection signal transmitted by the right probe 23 and a detection signal received by the right probe 23, it is determined that the obstacle is located in a right first region B1, and the right first region B1 is one sub-region in the right region B; and if the detection data includes the detection signal transmitted by the right probe 23 and the detection signal received by the right probe 23, and does not include the detection signal transmitted by the left probe 21 and the detection signal received by the left probe 21, it is determined that the obstacle is located in a left first region A1, and the left first region A1 is one sub-region in the left region A. When an obstacle is located in a region further close to the right in the moving direction of the automatic lawn mower 1, because a signal transmission and receiving range of the right probe 23 is deviated toward the left of the right probe, the detection signal transmitted by the right probe 23 cannot be received by the right probe 23 after being reflected by the obstacle. Therefore, when a combination of which the left probe 21 transmits the detection signal and the left probe 21 receives the detection signal can detect the obstacle, but a combination of which the right probe 23 transmits the detection signal and the right probe 23 receives the detection signal cannot detect the obstacle, it may be determined that the obstacle is located in the region further close to the right in the moving direction of the automatic lawn mower 1, that is, located in the right first region B1. Vice versa.

In an embodiment, if the detection data is only from the detection signal transmitted by the left probe 21 and the detection signal received by the left probe 21, it is determined that the obstacle is located in a right second region B2, and the right second region B2 is one sub-region in the right region B. Correspondingly, if the detection data is only from the detection signal transmitted by the right probe 23 and the detection signal received by the right probe 23, it is determined that the obstacle is located in a left second region A2, and the left second region A2 is one sub-region in the left region A. Specifically, the right/left second region B2/A2 is one sub-region relatively far away from the middle region C in the right/left region B/A. When the obstacle is located in the right second region B2, which is at an edge of a detectable region. Therefore, only the detection signal transmitted by the left probe 21 can be reflected, and only the left probe 21 can receive the reflected detection signal. Vice versa.

In an embodiment, if each probe transmits a detection signal, and the control module can obtain both detection data received by the same probe and the other probe, that is, if any combination of transmission and receiving of the detection signals can detect an obstacle, it is determined that the obstacle is located in the middle region C.

In an embodiment, distance parameters of the detection signals received by the probes 21 and 23 at different positions are compared, and the location of the obstacle is determined according to the distance parameters. The distance parameter is described below. Specifically, if a distance parameter of the detection signal received by the left probe 21 is greater than a distance parameter of the detection signal received by the right probe 23, it is determined that the obstacle is located in the right region B; and if the distance parameter of the detection signal received by the left probe 21 is less than the distance parameter of the detection signal received by the right probe 23, it is determined that the obstacle is located in the left region A. The distance parameter represents a distance between the obstacle and the automatic lawn mower 1. It may be understood that when the obstacle is farther from the left side than the right side of the automatic lawn mower 1, it may be determined that the obstacle is located on the right of the housing 15; and vice versa.

The division of a region in which the obstacle is located is only an example, and a relationship between the division of the region in which the obstacle is located and the identities of the ultrasonic sensors that transmit and receive the detection signals is related to factors such as a quantity of ultrasonic sensors, positions of the ultrasonic sensors on the housing 15, and setting angles of the ultrasonic sensors. No matter how the specific method for dividing the region in which the obstacle is located, or how the method for determining the location of the obstacle changes, the principle is to determine based on the detection data obtained by the control module and the corresponding identities of the sensors that transmit and receive the detection signals. In addition, the location of the obstacle can be determined according to the principle based on the time sharing control of transmitting and receiving the detection signals by each ultrasonic sensor, and different combinations of transmission and receiving of the detection signals are formed.

In this embodiment, the control module controls, according to a preset program, the ultrasonic sensors 21 and 23 to transmit and receive the detection signals sequentially. When obtaining a piece of detection data, the control module learns corresponding identities of the ultrasonic sensors that transmit and receive the detection signals, and the control module marks a current combination and stores detection data of the current combination. Certainly, under a particular combination of transmission and receiving of signals, the control module may alternatively not obtain detection data. After controlling the ultrasonic sensors to transmit and receive detection signals for one period, the control module outputs determining results of whether an obstacle exists in the moving direction of the automatic lawn mower 1 and a location of the obstacle according to an obtained detection data set and a combination mark corresponding to each detection data, and according to a preset location determining logic such as the embodiments listed above.

In an embodiment, the control module turns on each obstacle detection module in a time-sharing manner to receive the reflected detection signal. Specifically, each obstacle detection module is turned on in the time-sharing manner to receive the detection signal. For example, when the control module turns on the left probe 21 to receive the reflected detection signal, a signal receiving function of the left probe 21 is enabled, and a signal receiving function of the right probe 23 is disabled. Referring to FIG. 4, in this case, the obstacle detection dedicated control circuit 33 only receives the detection data transmitted by the left probe 21, and does not receive the detection data transmitted by the right probe 23.

In an embodiment, the control module turns on each obstacle detection module in a time-sharing manner to receive the reflected detection signal. Specifically, in response to the detection signals transmitted in the time-sharing manner, processing of the detection signal received by each obstacle detection module is enabled in the time-sharing manner. In other words, a receiving function of each probe for the reflected detection signal can be enabled at the same time, but only the detection signal received by the selected probe is processed. Referring to FIG. 4, in this case, the obstacle detection dedicated control circuit 33 may simultaneously receive the detection data transmitted by the left probe 21 and the right probe 23, but only processes the data transmitted by the selected probe.

According to the self-moving device and the obstacle detection method thereof of the foregoing embodiments, each obstacle detection module is turned on in a time-sharing manner to transmit a detection signal, and each obstacle detection module is turned on in the time-sharing manner to receive a reflected detection signal. Detection data processed by a control module each time corresponds to a unique identity of the sensor that transmits and receives the detection signals, that is, each detection data has a unique combination mark of transmission and receiving of signals. Therefore, after obtaining a plurality of pieces of detection data, especially after the combination of transmission and receiving of signals completes transmission and receiving of the signals for one period, the control module determines a location of an obstacle with reference to the detection data and the corresponding combination marks. Compared with a conventional method for determining the location of the obstacle according to a result of single signal transmission and receiving, the determining result of the embodiment is more reliable and flexible. According to the embodiments, after detection results of different combinations are combined, the location of the obstacle can be determined more accurately. Therefore, the obstacle avoidance manner of the self-moving device can be more flexible, the obstacle avoidance is also more reliable, a non-contact obstacle avoidance function of the self-moving device can be reliably achieved, and the safety of the product is improved.

According to the self-moving device and the obstacle detection method thereof of the foregoing embodiments, detection of the location of the obstacle is not separately associated with a position in which the obstacle detection module is located and an angle of the obstacle detection module. A determining result of the location of the obstacle is obtained through the cross arrangement of the obstacle detection modules, the combination manner of transmission and receiving of signals, and the association between the structure and control of each obstacle detection module. The self-moving device and the obstacle detection method thereof of the foregoing embodiments break through a detection logic corresponding to each obstacle detection module and each detection location on a conventional self-moving device, and a better detection effect than that obtained by independent and separate work of each conventional obstacle detection module is obtained depending on cooperation between a plurality of obstacle detection modules and a crossed detection method.

According to the self-moving device and the obstacle detection method thereof of the foregoing embodiments, the location of the obstacle is determined accurately with a relatively small quantity (greater than or equal to two) of ultrasonic sensors. Compared with a conventional manner of disposing a plurality of ultrasonic sensors on a front side and two sides of the housing of the self-moving device, the costs are reduced. In the foregoing embodiments, the arrangement manner of the ultrasonic sensor can further resolve a blindspot problem of the ultrasonic sensor. The blindspot refers to a region within a particular distance range of the ultrasonic sensor. Because an aftershock is generated as the ultrasonic sensor transmits a signal, the aftershock cannot be accurately distinguished from a received reflected signal in a region relatively close to the ultrasonic sensor. On the conventional self-moving device, a plurality of ultrasonic sensors need to be disposed on an outer end surface along contour lines of the front side and the two sides of the housing. Therefore, an obstacle in a region (the blindspot) relatively close to the housing cannot be detected. As a result, the self-moving device cannot implement non-contact obstacle avoidance completely. The arrangement of the ultrasonic sensor in the embodiments of the present invention resolves the problem, so that the self-moving device can effectively implement non-contact obstacle avoidance and improve the operation safety.

In an embodiment of the present invention, the control module further determines whether the detection data meets a preset threshold, and controls, in response to that at least one piece of the detection data meets the preset threshold, the self-moving device to move and/or turn to avoid an obstacle. Specifically, the detection data includes a signal strength parameter and a distance parameter.

The signal strength parameter indicates a strength of a reflected signal, which is related to a material of a reflector. For example, a strength of a reflected signal after a detection signal is reflected by an obstacle such as a tree is greater than a strength of a reflected signal after the detection signal is reflected by a tall grass. In this embodiment, by setting a threshold of the signal strength parameter, the control module responds only when the strength of the reflected signal is greater than a preset strength threshold, so that the control module can accurately determine existence of an obstacle to avoid misjudgment. For example, because the detection signal is reflected by the tall grass, an unnecessary obstacle avoidance action of the automatic lawn mower is caused.

The distance parameter indicates a distance between the obstacle and the automatic lawn mower 1. An obstacle within a relatively large distance range can be detected by using the detection signals transmitted by the ultrasonic sensors 21 and 23. However, in an actual application scenario of the automatic lawn mower 1, the automatic lawn mower 1 does not need to perform an obstacle avoidance action on a distant obstacle. Therefore, in this embodiment, a preset distance threshold is set, and the control module determines whether the distance parameter of the detection data is less than the preset distance threshold, and responds if the distance parameter is less than the preset distance threshold. A closer distance between the obstacle and the automatic lawn mower 1 indicates a faster obstacle avoidance response required by the automatic lawn mower 1.

In an embodiment, the obstacle avoidance action of the automatic lawn mower 1 includes deceleration. In an embodiment, the obstacle avoidance action of the automatic lawn mower 1 includes turning. Specifically, if determining that the obstacle is located in the right region B in the moving direction of the automatic lawn mower 1, the control module controls the automatic lawn mower 1 to turn left to avoid the obstacle; if determining that the obstacle is located in the left region A in the moving direction of the automatic lawn mower 1, the control module controls the automatic lawn mower 1 to turn right to avoid the obstacle; if determining that the obstacle is located in the middle region C in the moving direction of the automatic lawn mower 1, the control module controls the automatic lawn mower 1 to turn right or left randomly to avoid the obstacle. In an embodiment, when the obstacle avoidance action is performed, the control module controls the automatic lawn mower 1 to continue to move and turn. That is, the automatic lawn mower 1 does not stop or move back due to an obstacle. By using the obstacle avoidance manner, the moving and working of the automatic lawn mower 1 are smoother and more efficient, the performance of the automatic lawn mower 1 is more intelligent, and the user experience is better. As described above, according to the obstacle detection method of this embodiment of the present invention, the automatic lawn mower 1 can implement the obstacle avoidance manner without stop, and details are not described herein again.

Certainly, in another embodiment, the automatic lawn mower 1 may alternatively stop or move back when performing the obstacle avoidance action, and turn according to the determining of the location of the obstacle, which is still within the scope of the present invention.

In an embodiment, the obstacle avoidance response of the automatic lawn mower 1 is related to the distance parameter of the detection data. Specifically, a deceleration parameter and/or an angle parameter of which the automatic lawn mower 1 avoids the obstacle is related to the distance parameter, and the deceleration parameter and/or the angle parameter of which the automatic lawn mower 1 avoids the obstacle increases as the distance parameter decreases. That is, when a closer distance between the obstacle and the automatic lawn mower 1 is detected, a degree of deceleration of the automatic lawn mower 1 is larger, and/or a turning angle of the automatic lawn mower 1 is larger. In this way, when the automatic lawn mower 1 is very close to the obstacle, the automatic lawn mower 1 can avoid the obstacle as fast as possible. When the automatic lawn mower 1 is relatively far away from the obstacle, the automatic lawn mower 1 may first decelerate slowly and/or rotate for a relatively small angle, and then adjust an obstacle avoidance action according to a further detected obstacle condition. The advantage of adjusting the obstacle avoidance response of the automatic lawn mower 1 according to the distance parameter is that the obstacle avoidance response of the automatic lawn mower 1 is more flexible and the accessibility to the obstacle is better. In an embodiment, when the distance parameter is reduced to a minimum distance parameter, the deceleration parameter and/or the angle parameter of which the automatic lawn mower 1 avoids the obstacle reaches a maximum value. If the distance parameter is further reduced, the deceleration parameter and/or the angle parameter remains at the maximum value. In other words, when the obstacle is close enough to the automatic lawn mower 1, the automatic lawn mower 1 always avoids the obstacle at the maximum deceleration and/or turning angle. This is to ensure the safety of the operation of the automatic lawn mower 1 and avoid the collision with the obstacle.

In an embodiment, when determining that an abnormal obstacle is detected, the control module controls, in response to a deceleration parameter and/or an angle parameter of a minimum distance parameter, the automatic lawn mower 1 to avoid the obstacle. The detecting an abnormal obstacle includes detecting an intrusion of an obstacle or detecting a dynamic obstacle. For example, an object, which may be a living body such as a user, children, or a pet or may be a fast moving object, or the like, suddenly appears in the moving direction of the automatic lawn mower 1.

In an embodiment, a preset distance threshold for the automatic lawn mower 1 to make an obstacle avoidance response is related to a sub-region in which the obstacle is located. Referring to FIG. 5(*a*), FIG. 5(*b*), and FIG. 5(*c*) again, the left region A and the right region B are divided into N sub-regions, where N is an integer greater than 1, and an $(N-1)^{th}$ region is closer to the middle region C than an $N^{th}$ region. A preset distance threshold of the middle region C is greater than preset distance thresholds of the left region A and the right region B; and a preset distance threshold of the $(N-1)^{th}$ region is greater than a preset distance threshold of the $N^{th}$ region. In other words, when an obstacle is closer to the front of the moving direction of the automatic lawn mower 1, a preset distance threshold is larger, and a distance between the obstacle and the automatic lawn mower 1 when making an obstacle avoidance response is larger; and when the obstacle is farther away from the front of the moving direction of the automatic lawn mower 1, the preset distance threshold is smaller, and the distance between the obstacle and the automatic lawn mower 1 when making the obstacle avoidance response is smaller. When an obstacle is located in the front of the moving direction of the automatic lawn mower 1, a probability that the automatic lawn mower 1 collides with the obstacle is larger, and a risk is larger. Therefore, the preset distance threshold is larger, and the automatic lawn mower 1 makes an obstacle avoidance response earlier. On the contrary, when the obstacle is far away from the front of the moving direction of the automatic lawn mower 1, the automatic lawn mower 1 can avoid the obstacle relatively easily. Therefore, a relatively small preset distance threshold may be set, and the automatic lawn mower 1 makes the obstacle avoidance response when being closer to the obstacle. In this way, the automatic lawn mower 1 has better accessibility to the obstacle and can cut the grass near the obstacle.

In an embodiment, the control module determines a location of an obstacle according to detection data obtained under a plurality of combinations of transmission and receiving of detection signals. When the control module compares whether the distance parameter meets the preset distance threshold, that is, a distance parameter of at least one piece of the detection data meets the preset distance threshold, the automatic lawn mower 1 is controlled to make an obstacle avoidance response.

Figure 6:
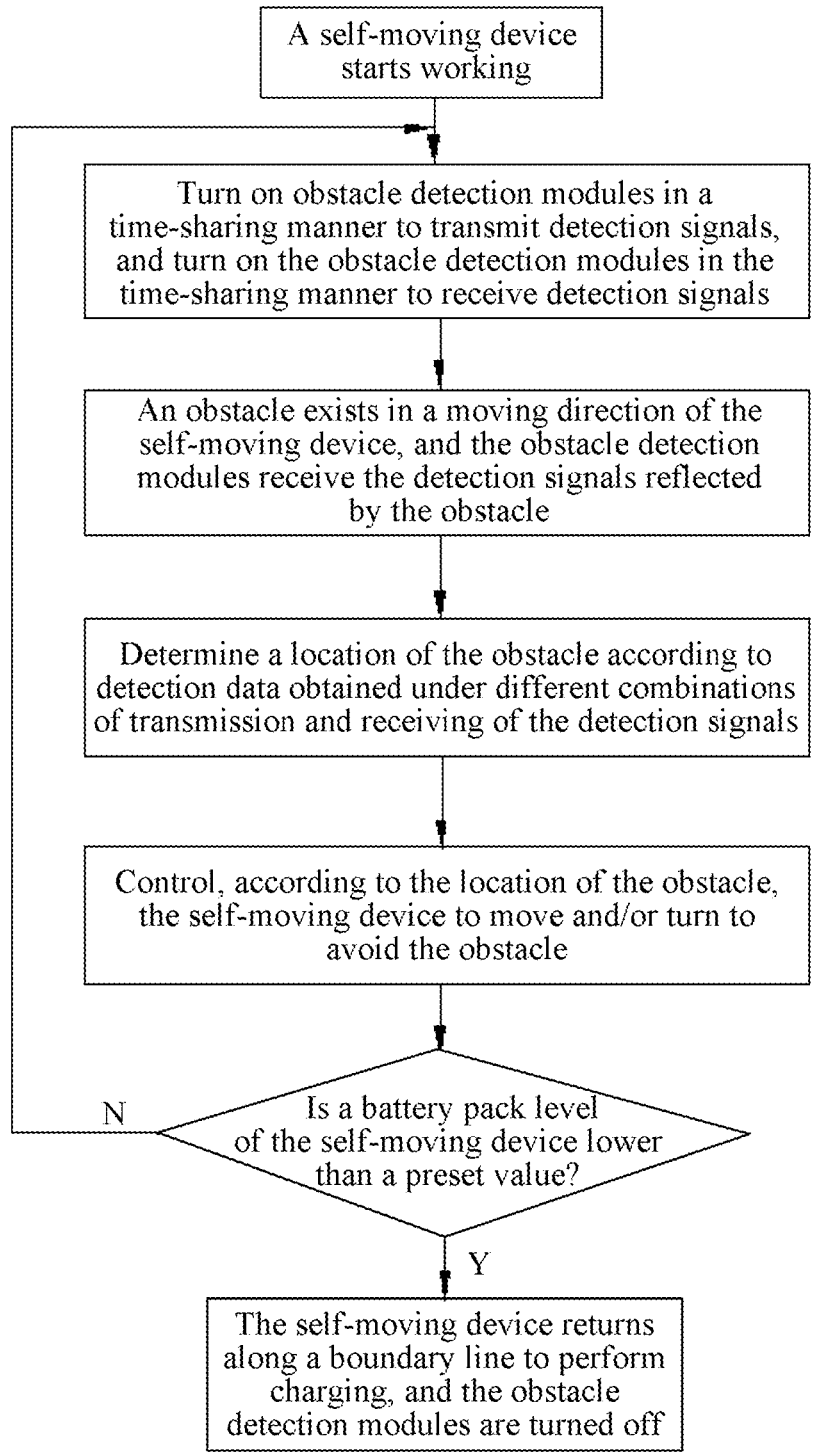
FIG. 6 is a schematic diagram of an obstacle detection process of an automatic lawn mower according to some embodiments of the present invention.

The obstacle detection process of the automatic lawn mower 1 according to an embodiment of the present invention is described below with reference to FIG. 1 and FIG. 2. The automatic lawn mower 1 leaves the charging station 5 and enters the working region 7 to work, and the automatic lawn mower 1 moves along a preset path or moves randomly in the working region 7 and performs a mowing work. When the automatic lawn mower 1 moves and works in the working region 7, the ultrasonic sensors 21 and 23 are in a normal working state, that is, the ultrasonic sensors 21 and 23 are turned on in a time-sharing manner to transmit a detection signal and receive a detection signal. When there is no obstacle in a moving direction of the automatic lawn mower 1, the ultrasonic sensors 21 and 23 do not receive the detection signal, or do not receive the detection signal that meets a preset threshold. When an obstacle occurs in the moving direction of the automatic lawn mower 1 (the obstacle is, for example, a table and a chair placed in a garden of a user), detection signals transmitted by the ultrasonic sensors 21 and 23 are reflected by the obstacle, and the ultrasonic sensors 21 and 23 receive the detection signals reflected by the obstacle. Under different combinations of transmission and receiving of the detection signals, the control module obtains a plurality of pieces of detection data, and determines a location of the obstacle based on the detection data under different combinations according to a preset program algorithm. For example, if the detection signal transmitted by each ultrasonic sensor 21 (23) can be received by the each ultrasonic sensor and the other ultrasonic sensor, it is determined that the obstacle is located in the middle region C in the moving direction of the automatic lawn mower 1. The control module determines whether a distance parameter of the obtained detection data meets the preset distance threshold, and if one distance parameter meets the preset distance threshold, controls the automatic lawn mower 1 to make an obstacle avoidance response, for example, controls the automatic lawn mower 1 to decelerate and turn, especially controls the automatic lawn mower 1 to continue to move and turn to avoid the obstacle. Certainly, the control module further determines whether a signal strength parameter of the obtained detection data meets the preset strength threshold, and if the signal strength parameter meets the preset strength threshold, controls the automatic lawn mower 1 to perform an obstacle avoidance action. After avoiding the obstacle, the automatic lawn mower 1 continues to move and work in the working region 7 until the control module determines that the battery pack level is lower than a preset value, the automatic lawn mower 1 turns on a returning program, and under the returning program, the automatic lawn mower 1 moves to a boundary line and returns to the charging station 5 along the boundary line to replenish electric energy. The automatic lawn mower 1 may choose to turn off the ultrasonic sensors under the returning program, especially when returning to the charging station along the boundary line. The automatic lawn mower 1 performs cycle on the working and charging process until a working plan is completed. FIG. 6 is a schematic diagram of an obstacle detection process of a corresponding automatic lawn mower.

In another embodiment of the present invention, when one obstacle detection module transmits a detection signal, a plurality of obstacle detection modules may be turned on simultaneously to receive the detection signal, that is, in response to one detection signal transmission, the control module obtains and processes detection data corresponding to the detection signals received by the plurality of obstacle detection modules. The control module can learn identities of the obstacle detection modules that receive the detection signals corresponding to the obtained detection data, so as to set different combination marks for different detection data. The control module determines a location of an obstacle according to the detection data obtained under different combinations of transmission and receiving of the detection signals, and the identity of the obstacle detection module that transmits the detection signal and the identity of the obstacle detection module that receives the detection signal that correspond to the detection data. Specifically, for the detection data obtained from the plurality of obstacle detection modules at the same time, a processing sequence of the control module can be set by using a preset program, and the detection data is respectively marked according to the corresponding identities of the obstacle detection modules that receive the detection signals in the processing sequence.

In an embodiment of the present invention, the automatic lawn mower 1 includes an obstacle avoidance program module, providing a first driving circuit instruction to avoid an obstacle; where the obstacle avoidance program module defines identities of obstacle detection modules and the identities of the obstacle detection modules are associated with projection positions of the obstacle detection module on a housing; a determining result of a location of the obstacle is obtained according to detection data, and the identity of the obstacle detection module that transmits the detection signal and the identity of the obstacle detection module that receives the detection signal that correspond to the detection data; the first driving circuit instruction is provided according to the location of the obstacle; the first driving circuit instruction is provided according to the location of the obstacle; and the obstacle avoidance program module further provides a second driving circuit instruction to transmit a detection signal sequentially/in a time-sharing manner, and monitor a received detection signal by enabling receiving of the detection signal sequentially/in a time-sharing manner. In this embodiment, the obstacle avoidance program module may be formed by a hardware and/or software.

An embodiment of the present invention further provides an obstacle detection method for a self-moving device. The self-moving device includes the obstacle detection module. The detection method includes the following steps: controlling one of the obstacle detection modules to be turned on to transmit a detection signal, and controlling the same obstacle detection module or the other obstacle detection module to be turned on to receive a reflected detection signal; obtaining detection data based on the received detection signal; determining a location of an obstacle based on the obtained detection data, and an identity of the obstacle detection module that transmits the detection signal and an identity of the obstacle detection module that receives the detection signal, where the identities of the obstacle detection modules are related to positions of the obstacle detection module relative to a housing of the self-moving device; and controlling, according to the location of the obstacle, the self-moving device to move and/or turn to avoid the obstacle. For the specific steps and possible deformations involved in the obstacle detection method, reference may be made to the related descriptions in the foregoing embodiments, and details are not described herein again.

In this embodiment of the present invention, the control module may include an embedded digital signal processor (DSP), a microprocessor unit (MPU), an application-specific integrated circuit (ASIC), a programmable logic device (PLD), a system on chip (SOC), a central processing unit (CPU), a field programmable gate array (FPGA), or the like.

The present invention is not limited to the structures and the method of the specific embodiments described herein and method, and structures based on the concepts of the present invention shall and method fall within the protection scope of the present invention.

What is claimed is:

1. A self-moving device comprising:
   a housing;
   a moving module;
   a working module;
   at least two non-contact obstacle detection modules, respectively located on two sides of the housing in a moving direction, and configured to transmit and receive detection signals, and detect an obstacle in the moving direction of the self-moving device;
   a control module, configured to:

control the moving module to drive the self-moving device to move and control the working module to perform a work task;

determine a location of the obstacle based at least in part on detection data;

control the self-moving device to move and/or turn to avoid the obstacle based at least in part on the determined location of the obstacle;

determine that the obstacle is located in a right first region of a right region if the detection data comprises a detection signal transmitted and received by a left obstacle detection module of the at least two non-contact obstacle detection modules and does not comprise any detection signal transmitted and received by a right obstacle detection module of the at least two obstacle detection modules;

determine that the obstacle is located in a left first region of a left region if the detection data comprises a detection signal transmitted and received by a right obstacle detection module of the at least non-contact two obstacle detection modules and does not comprise any detection signal transmitted and received by the left obstacle detection module; and determine that the obstacle is located in the right region or a middle region in the moving direction of the self-moving device if the left obstacle detection module transmits a first detection signal, and the detection data comprises the first detection signal reflected by the obstacle and received by the left obstacle detection module.

2. The self-moving device according to claim 1, wherein the at least two non-contact obstacle detection modules comprise axes in signal transmitting directions, and the at least two non-contact obstacle detection modules are disposed opposite to each other, so that projections of the axes on a working plane intersect in front of the at least two non-contact obstacle detection modules.

3. The self-moving device according to claim 1, wherein the control module is further configured to control the at least two non-contact obstacle detection modules to sequentially transmit the detection signals and sequentially enable the at least the two non-contact obstacle detection modules to receive the detection signals.

4. The self-moving device according to claim 1, wherein the control module is further configured to:
select a first obstacle detection module of the at least two non-contact obstacle detection modules to be turned on to transmit one or more detection signals and select a second obstacle detection module of the at least two non-contact obstacle detection modules to be turned on to receive the one or more detection signals to form different combinations of transmission and receiving of the one or more detection signals; and
determine the location of the obstacle based at least in part on detection data obtained by at least two different combinations of transmission and receiving of the one or more detection signals.

5. The self-moving device according to claim 4, wherein the control module is further configured to determine the location of the obstacle according to the detection data obtained within one period implemented by the at least two different combinations of transmission and receiving of the one or more detection signals.

6. The self-moving device according to claim 1, wherein the control module is further configured to:
select a first obstacle detection module of the at least two non-contact obstacle detection modules to be turned on to transmit one or more detection signals and select a second obstacle detection module of the at least two non-contact obstacle detection modules to be turned on to receive the one or more detection signals to form different combinations of transmission and receiving of the one or more detection signals.

7. The self-moving device according to claim 1, wherein a detection region is formed by the at least two non-contact obstacle detection modules and is divided into a plurality of sub-regions;
the control module is further configured to determine a sub-region in which the obstacle is located based at least in part on the detection data, a corresponding identity of an obstacle detection module of the at least two non-contact obstacle detection modules that transmits the detection signal, and a corresponding identity of an obstacle detection module of the at least two non-contact obstacle detection modules that receives the detection signal; and
the sub-regions comprise the left region and the right region in the moving direction of the self-moving device.

8. The self-moving device according to claim 1, wherein the left obstacle detection module is disposed on a left side of the housing, and the right obstacle detection module is disposed on a right side of the housing.

9. The self-moving device according to claim 1, wherein the control module is further configured to:
determine that the obstacle is located in the left region or the middle region if the right obstacle detection module transmits a second detection signal, and the detection data comprises the second detection signal reflected by the obstacle and received by the right obstacle detection module.

10. The self-moving device according to claim 1, wherein the control module is further configured to:
determine that the obstacle is located in a right second region of the right region in the moving direction of the self-moving device if the detection data comprises only the detection signal transmitted and received by the left obstacle detection module; and
determine that the obstacle is located in a left second region of the left region in the moving direction of the self-moving device if the detection data comprises only the detection signal transmitted and received by the right obstacle detection module.

11. The self-moving device according to claim 1, wherein:
the detection data further comprises respective distance parameters of the detection signals;
the control module is further configured to determine that the obstacle is located in the right region if a distance parameter of a second detection signal received by the left obstacle detection module is greater than a distance parameter of a third detection signal received by the right obstacle detection module; and
the control module is further configured to determine that the obstacle is located in the left region if the distance parameter of the second detection signal received by the left obstacle detection module is less than the distance parameter of the third detection signal received by the right obstacle detection module.

12. The self-moving device according to claim 1, wherein the control module is further configured to determine that the obstacle is located in the middle region in the moving direction of the self-moving device if the left obstacle detection module or the right obstacle detection module transmits a second detection signal, and the left obstacle detection module and the right obstacle detection module receive the second detection signal.

13. A self-moving device comprising:
a moving module comprising a drive and a first driving circuit connected to the drive;
at least two non-contact obstacle detection modules, configured to transmit and receive detection signals reflected by an obstacle, to detect the obstacle in a moving direction of the self-moving device; and
a control circuit, configured to:
execute a second driving circuit instruction to cause the at least two non-contact obstacle detection modules to transmit the detection signals, monitor the detection signals received by the at least two non-contact obstacle detection modules, and obtain detection data; and
execute a first driving circuit instruction to cause the moving module to drive the self-moving device to change a moving manner to avoid the obstacle;
an obstacle avoidance program module, configured to:
provide the first driving circuit instruction to avoid the obstacle based at least in part on a location of the obstacle;
obtain a determining result of the location of the obstacle based at least in part on the detection data;
determine that the obstacle is located in a right first region of a right region if the detection data comprises a detection signal transmitted and received by a left obstacle detection module of the at least two non-contact obstacle detection modules and does not comprise any detection signal transmitted and received by a right obstacle detection module of the at least two obstacle detection modules;
determine that the obstacle is located in a left first region of a left region if the detection data comprises a detection signal transmitted and received by a right obstacle detection module of the at least non-contact two obstacle detection modules and does not comprise any detection signal transmitted and received by the left obstacle detection module; and
determine that the obstacle is located in the right region or a middle region in the moving direction of the self-moving device if the left obstacle detection module transmits a first detection signal, and the detection data comprises the first detection signal reflected by the obstacle and received by the left obstacle detection module.

14. The self-moving device according to claim 13, wherein the at least two obstacle detection modules are further configured to sequentially transmit the detection signals, and sequentially enable receiving of the detection signals, to form at least two different combinations of transmission and receiving of the detection signals; and
the obstacle avoidance program module is further configured to obtain the location of the obstacle based further on detection data obtained by the at least two different combinations of transmission and receiving of the detection signals.

15. The self-moving device according to claim 13, wherein the obstacle avoidance program module is further configured to monitor the detection signals received by the at least two non-contact obstacle detection modules to form different combinations of transmission and receiving of the detection signals by:
when one obstacle detection module is turned on to transmit a second detection signal, controlling the one obstacle detection module of the at least two non-contact obstacle detection modules to be turned on to receive the second detection signal or controlling another obstacle detection module of the at least two non-contact obstacle detection modules to be turned on to receive the second detection signal.

16. An obstacle detection method for a self-moving device, comprising:
controlling at least one of a left obstacle detection module or a right obstacle detection module of multiple obstacle detection modules of the self-moving device to be turned on to transmit a detection signal, and controlling one or more of the left obstacle detection module or the right obstacle detection module to be turned on to receive a reflected detection signal;
obtaining detection data based on the received detection signal;
determining a location of an obstacle based at least in part on the obtained detection data, wherein determining the location of the obstacle comprises:
determining that the obstacle is located in a right first region of a right region if the detection data comprises a detection signal transmitted and received by the left obstacle detection module and does not comprise any detection signal transmitted and received by the right obstacle detection module;
determining that the obstacle is located in a left first region of a left region if the detection data comprises a detection signal transmitted and received by the right obstacle detection module and does not comprise any detection signal transmitted and received by the left obstacle detection module; and
determining that the obstacle is located in the left region or the middle region if the right obstacle detection module transmits a first detection signal, and the detection data comprises the first detection signal reflected by the obstacle and received by the right obstacle detection module; and
controlling, according to the location of the obstacle, the self-moving device to move and/or turn to avoid the obstacle.

17. The obstacle detection method according to claim 16, wherein the multiple obstacle detection modules comprise axes in signal transmitting directions, and the multiple obstacle detection modules are disposed opposite to each other, so that projections of the axes on a working plane intersect in front of the multiple obstacle detection modules.

18. The obstacle detection method according to claim 16, further comprising determining the location of the obstacle based at least in part on at least two different combinations of transmission and receiving of detection signals.

* * * * *